April 3, 1951 — A. M. SUCKSDORF — 2,547,507
FISHING ROD GUIDE
Filed Dec. 11, 1946 — 2 Sheets-Sheet 1
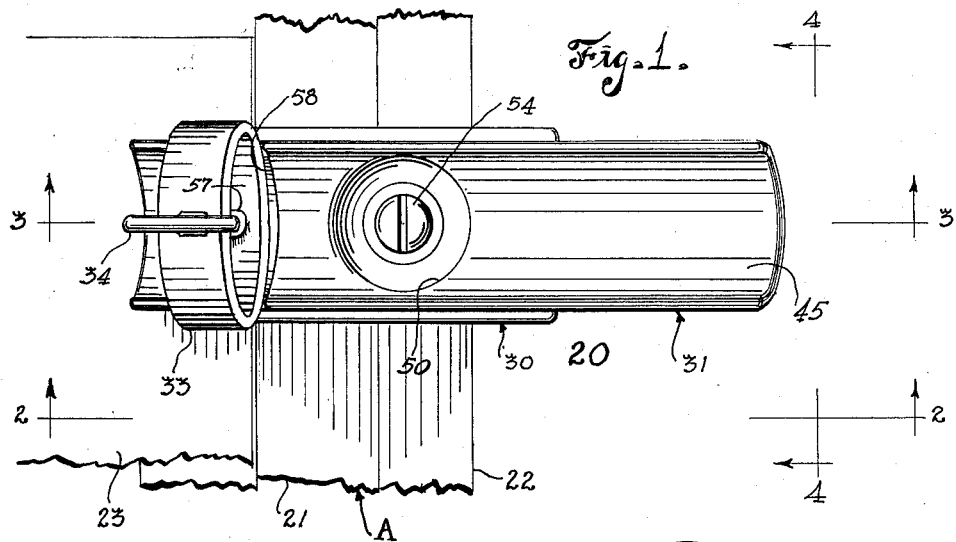
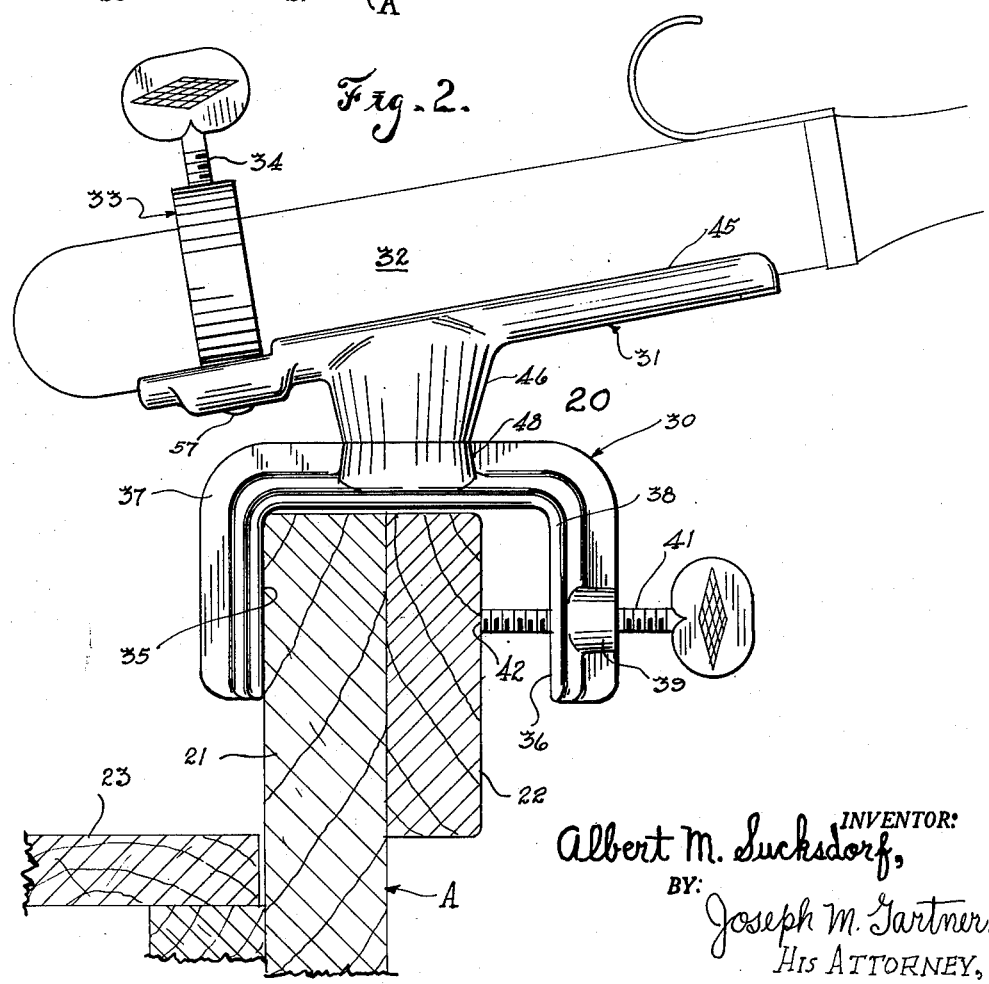
INVENTOR:
Albert M. Sucksdorf,
BY: Joseph M. Gartner,
His ATTORNEY,

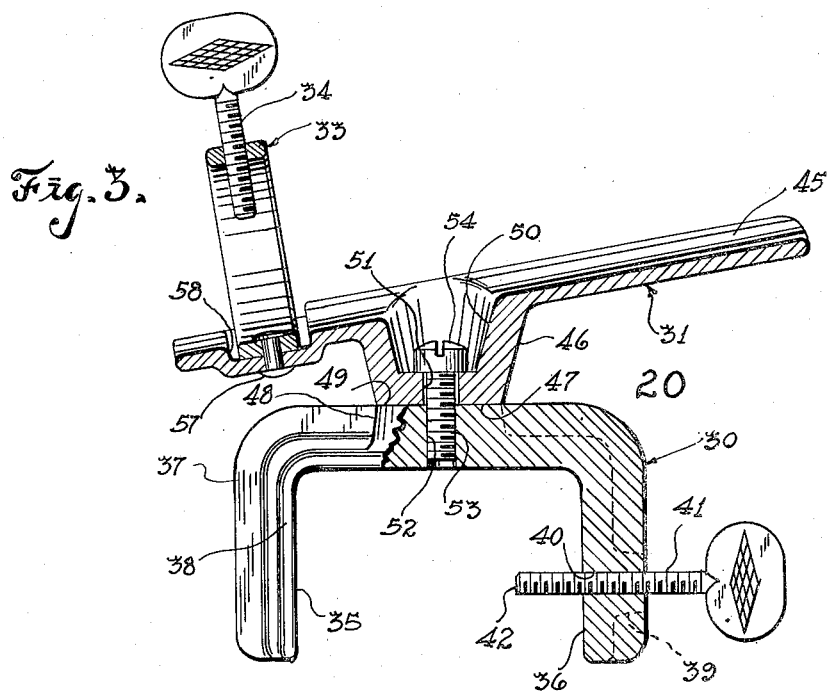
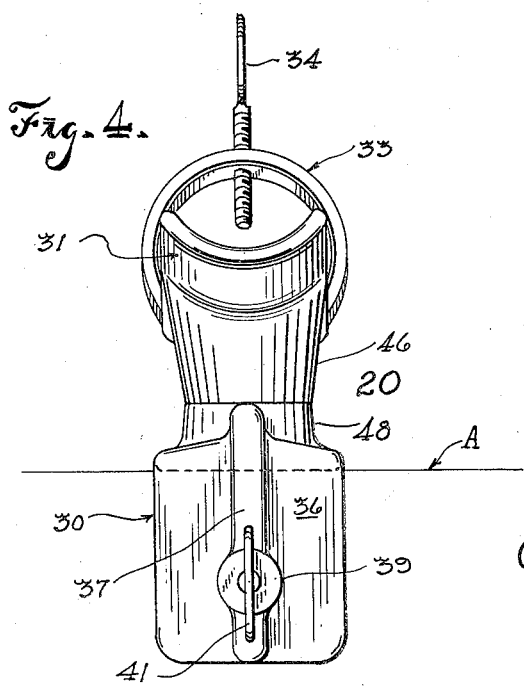

Patented Apr. 3, 1951

2,547,507

UNITED STATES PATENT OFFICE 2,547,507

FISHING ROD GUIDE

Albert M. Sucksdorf, Chicago, Ill.

Application December 11, 1946, Serial No. 715,584

4 Claims. (Cl. 248—42)

The invention relates generally to fishing rod guides and is particularly concerned with fishing rod guides of the type which are adaptable to be conveniently and quickly secured to or removed from either side or end of a conventional row boat and having incorporated therein means to hold a fishing rod or pole securely in place when trolling to prevent weed snags or a strong current from pulling the fishing rod or pole out of the guide.

The invention seeks, as a principal object and accomplishment, to provide a fishing rod guide such as contemplated herein and characterized by a combination of parts arranged to more satisfactorily perform the various functions required of them and adapted to provide a compact assembly which will successfully combine the factors of structural simplicity and durability, and yet be economical to manufacture.

Another object and accomplishment of the invention is to improve the construction of fishing rod guides as contemplated herein with respect to efficiency of operation and to ready adaptability of the fishing rod guide to securement to or removal from its operative position on a conventional row boat without alteration or requirement of tools; and to this end, a feature of the invention is to provide a fishing rod guide comprising, in general, a bracket having means whereby said bracket may be conveniently, quickly, yet securely clamped to, or, be removed from, the sides or ends of a conventional row boat, a cradle member adjustably and removably secured to said bracket and suitably formed to receive a fishing rod or pole, and a ring member fixedly secured to said cradle member adjacent one end thereof and adaptable to receive end portions of said fishing rod or pole and having means associated therewith to engage and thereby hold said pole or rod in position in the cradle member.

The invention also comprehends the provision of a fishing rod guide embodying the principles as hereinbefore set forth, but characterized by the absence of the bracket, the cradle member in this instance being adaptable to be advantageously secured by a suitable screw to a pier or other water edge structure.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawings which form a part of this specification, wherein:

Figure 1 is a top plan view of a fishing rod guide embodying the features of the present invention and shown as being employed adjunctively to side members of a conventional row boat;

Figure 2 is a side elevational view of the fishing rod guide depicted in Figure 1 and being taken substantially on the plane of the line 2—2 in Figure 1;

Figure 3 is a side sectional view of the fishing rod guide depicted in Figure 1 and being taken substantially on the plane of the line 3—3 in Figure 1; and Figure 4 is an end elevational view of the fishing rod guide depicted in Figure 1 and being taken substantially on the plane of the line 4—4 in Figure 1.

The drawings are to be understood as being more or less of a schematic character for the purpose of illustrating and disclosing a typical or preferred form of the improvements contemplated herein, and in the drawings like reference characters identify the same parts in the several views.

Referring to the drawings, specifically Figs. 1 and 2, I have illustrated the fishing rod guide with which the subject invention is particularly concerned and designated in its entirety by the numeral 20, as being employed in an adjunctive capacity, for example, to a conventional row boat designated in its entirety by the letter A and comprising, in general, a side member 21 having a reinforcing gunwale 22 secured thereto and said side member supporting a suitable row boat seat as at 23.

Suffice it to say, since the invention is not particularly concerned with the precise construction of the row boat A and its associated parts, they will not be further described in detail and it is deemed sufficient for all intents and purposes herein contained to show only portions thereof adjacent to and cooperating with said fishing rod guide. It is to be understood that details of the row boat and its associated parts may be modified to suit particular conditions, and may in some cases be other types of boats or may be a pier, and I do not wish to be limited to details of the construction of these elements as set forth.

Having thus described the general environment surrounding the fishing rod guide with which the present invention is particularly concerned, the specific construction and the cooperating functions of the parts of said fishing rod guide will now be described in detail.

In the exemplary embodiment of the invention depicted in Figs. 1, 2, 3, and 4, the fishing rod guide 20, in general, comprises a bracket 30 having means whereby said bracket may be conveniently, quickly, yet be securely clamped to, or be removed from, the sides or ends of a conventional row boat, a cradle member 31 adjustably and removably secured to the bracket 30 and suitably formed to receive a fishing rod or pole as at 32 (Fig. 2), and a ring member 33 fixedly secured to said cradle 31 adjacent one end thereof and adaptable to receive end portions of said fishing rod 32 and having wing nut means 34 associated therewith to engage and hold said pole or rod in position in the cradle member 31.

The bracket 30 may be cast, by any approved practice, of a preferably light metal such as, for example, aluminum, aluminum alloys or the like, to define a substantially inverted U-shape with downwardly extending legs 35 and 36 adaptable to straddle, for example, the side 22 of a conventional row boat (Fig. 2) and having suitable stiffening ribs and flanges as at 37 and 38. Integrally formed with the leg 36, I have provided a hub 39 having a contral suitably threaded through aperture 40 (Fig. 3) adaptable to receive a suitable threaded wing nut 41 which may be tightened by the operator until end portions of the nut 41 as at 42 will engage, for example, the reinforcing gunwale 22 of the row boat A, thereby causing the leg 35 to be drawn into engagement with the inner surface of the side 21 which will cause the bracket to be quickly, yet securely clamped into operative position.

The cradle member 31 may be cast, by any approved practice, of a preferably light metal such as, for example, aluminum, alminum alloys or the like, to define an arcuately shaped body 45 adaptable to receive portions of a conventional fishing pole 32 (Fig. 2). Integrally formed with the body 45 is a hub as at 46 having a smooth finished surface as at 49.

It is notable that the cradle member 31 is adjustably and removably secured to the bracket 30. This is advantageously accomplished by the provision of a cavity 50 (Fig. 3) internally of the hub member 46, the plain central through aperture 51, and the suitably threaded aperture 52 in alignment with the aperture 51 and adaptable to receive threaded portions 53 of a suitable slotted head machine screw 54. Adjustability of the cradle member 31 is accomplished, for example, by loosening the screw 54 by means of a screw driver and thereafter rotating the cradle member about the axis of the screw 54 to a desired position and then tightening the screw 54 to hold the cradle in the desired position or, if it is desired to have the cradle swing or pivot on the aforementioned axis, the screw may be left loose. The cradle member 31 may be removed from the bracket 30 by merely removing the screw 54.

In combination with the aforementioned features of the fishing rod guide as contemplated herein, I have provided the circular ring member 33 fixedly secured to the cradle member 31 adjacent one end thereof in a depression as at 58 (Fig. 2) by means of a suitable rivet 57. The ring member 33 is adaptable to receive end portions of the fishing rod 32 (Fig. 2), and the wing nut 34 being adaptable to be screwed by the operator into engagement with said fish pole, will hold said fish pole in position in the cradle member when trolling to prevent weed snags or strong current from pulling the fishing rod or pole out of the guide. This feature permits the free use of the hands to adjust other poles and/or to maneuver the boat to an advantageous position for pulling in a hooked fish. This is particularly true in deep sea fishing where the fish is allowed to "play" before being brought in to the boat.

The invention also comprehends the provision of a fishing rod guide embodying the principles as hereinbefore set forth, but characterized by the absence of the bracket 30. In some cases it may be advantageous and desirable to fixedly secure the cradle member 31 to a pier or other structure on the water's edge. In such an event the bracket 30 may not be needed and, accordingly, may be removed from the cradle as hereinbefore described. It is desirable to substitute a suitable conventional wood screw (not shown) for the machine screw 54, which wood screw would be adaptable to be received into the aperture 51 and screwed into the wood structure of the pier, thereby to hold the cradle in operative position.

It is notable that in some instances it may be advantageous and desirable to cast the associated parts of the fishing rod guide of metals other than aluminum or aluminum alloys, and in such instances the fishing rod guide may be enameled in any desirable color scheme and character of ornamentation.

From the foregoing disclosure, it can be observed that I have provided a fishing rod guide which efficiently fulfills the objects thereof as hereinbefore set forth and provides numerous advantages which may summarized as follows:

(1) Structurally simple, efficient and durable;
(2) Economical to manufacture and readily adaptable to mass production manufacture;
(3) Readily adaptable and adjustable to be secured to a boat or pier; and
(4) Permits free use of the hands to adjust other poles and/or to maneuver a boat when trolling and prevents pole from being pulled from the boat by weeds, snags, etc.

While I have illustrated a preferred embodiment of my invention, many modifications may be made without departing from the spirit of the invention, and I do not wish to be limited to the precise details of construction set forth, but wish to avail myself of all changes within the scope of the appended claims.

Having thus described my invention, what I claim as new and desire to secure by Letters Patent of the United States, is:

1. The combination with an angularly disposed arcuately shaped rod carrier adapted to be mounted on a support and formed of a single casting with a hub portion extending downwardly therefrom and having a cavity extending substantially into said hub portion and opening into the arcuately shaped rod carrier, said cavity being provided with a central through aperture, of a non-compressible ring member fixedly secured to said carrier rearwardly of said cavity and of a substantially larger diameter than the rod in order to receive end portions of same in spaced encircling relationship, adjustable wing nut means carried by said ring and having portions adapted to engage end portions of the rod to securely hold the same in position, and adjustable pivot means in said cavity and extending through said aperture into said support and arranged selectively respectively to hold said carrier in an adjusted position and to permit said carrier to swivel in a horizontal plane about the axis of said pivot means.

2. The combination with an angularly disposed arcuately shaped fishing rod carrier adapted to be mounted on a support and formed of a single casting with a hub portion extending downwardly therefrom and having a cavity extending substantially into said hub portion and opening into the arcuately shaped fishing rod carrier, said cavity being provided with a central through aperture, of a non-compressible ring member fixedly secured to said carrier rearwardly of said cavity and of a substantially larger diameter than the rod in order to receive end portions of same in spaced encircling relationship, and screw means in said cavity and extending through said aperture into said support and arranged selectively respectively to hold said carrier in an adjusted position when tightened and to permit said carrier to swivel in a horizontal plane about the axis of said screw means when loosened.

3. A fishing rod guide adapted to be mounted on a support comprising a cradle member formed of a single casting to define an arcuately shaped fishing rod supporting portion adapted to be maintained in a fixed angularly disposed position with a hub portion extending downwardly therefrom and having a cavity extending substantially into said hub portion and opening into the fishing rod supporting portion, said cavity being provided with a central through opening to receive a screw having threaded end portions adapted to be received into said support, whereby when the screw is tightened the cradle member will be held in an adjusted position and when the screw is left loose the cradle may swivel about the axis of the screw, said fishing rod supporting portion having an offset portion disposed rearwardly of said cavity, a non-compressible ring member fixedly secured to said fishing rod supporting portion at said offset portion and of a substantially larger diameter than the fishing rod in order to receive end portions of same in spaced encircling relationship, and adjustable wing nut means carried by said ring and having portions adapted to engage end portions of the fishing rod to securely hold the same in position.

4. In a rod guide adapted to be mounted on a support, the combination of a cradle member formed of a single casting to define an arcuately shaped rod supporting portion adapted to be maintained in a fixed angularly disposed position with a hub portion extending downwardly therefrom and having a cavity extending substantially into said hub portion and opening into the rod supporting portion, said cavity being provided with a central through opening screw means in said opening having end portions adapted to be received into said support to hold said cradle in an adjusted position or to swivel about the axis of the screw means in a horizontal plane respectively when tightened or loosened, a non-compressible ring member fixedly secured to said rod supporting portion rearwardly of said cavity and of a substantially larger diameter than the fishing rod in order to receive end portions of same in spaced encircling relationship, and adjustable wing nut means carried by said ring and having portions adapted to engage end portions of the rod to securely hold the same in position.

ALBERT M. SUCKSDORF.

REFERENCES CITED

The following references are of record in the file of this patent:

UNITED STATES PATENTS

| Number | Name | Date |
| --- | --- | --- |
| 612,048 | Miller et al. | Oct. 11, 1898 |
| 2,199,034 | Witczak | Apr. 30, 1940 |
| 2,301,885 | Laehr | Nov. 10, 1942 |